Sept. 19, 1967     W. J. SACKETT, SR     3,342,352
SYSTEM FOR MAXIMUM UTILIZATION OF SPACE IN STORAGE OF LOOSE BULK MATERIALS
Filed July 27, 1965     3 Sheets-Sheet 1

Walter J. Sackett, Sr.
INVENTOR

BY Walter G. Finch
ATTORNEY

Sept. 19, 1967 W. J. SACKETT, SR 3,342,352
SYSTEM FOR MAXIMUM UTILIZATION OF SPACE IN STORAGE
OF LOOSE BULK MATERIALS
Filed July 27, 1965 3 Sheets-Sheet 2

Walter J. Sackett, Sr.
INVENTOR

BY Walter G. Finch
ATTORNEY

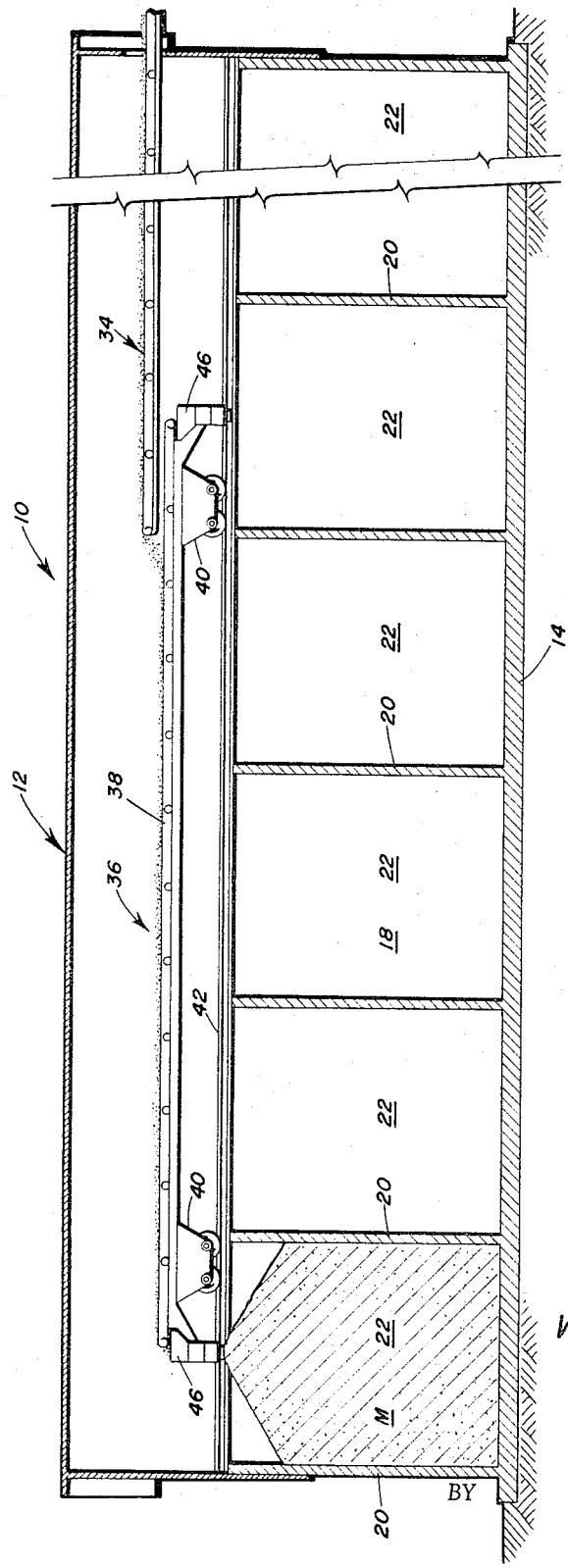

United States Patent Office 3,342,352
Patented Sept. 19, 1967

3,342,352
SYSTEM FOR MAXIMUM UTILIZATION OF SPACE IN STORAGE OF LOOSE BULK MATERIALS
Walter J. Sackett, Sr., Baltimore, Md., assignor to The A. J. Sackett & Sons Company, Baltimore, Md., a corporation of Maryland
Filed July 27, 1965, Ser. No. 475,135
10 Claims. (Cl. 214—16)

ABSTRACT OF THE DISCLOSURE

A building arrangement is provided for storing granular material on a base. This building consists of a supporting wall structure defining a storage bin on the base and having its upper end open. The wall structure is provided with an opening therein which terminates at the base, together with spaced supporting walls which extend into the storage bin from each side of the opening. Each supporting wall is provided with a corresponding upper angular surface extending downwardly into the storage bin from the opening and terminating short of the base. In addition, pintle means are positioned along the top edge of the wall structure defining the opening for securing a movable door to the top edge of the wall structure defining the opening, with the movable door being secured against the upper angular surfaces of the spaced supporting walls in a closed position in the opening by the weight of the stored granular material thereabove and arranged to be opened fully for access to the storage bin when the storage bin is being emptied of granular material through the opening.

A plurality of storage bins can be provided as required with similar type openings. The bin or bins are filled with granular material by conveyors positioned above the bins. A first conveyor system is provided for receiving the granular material as it first enters the building, and a second conveyor system is provided for receiving the discharge of material from the first conveyor system and directing it to the desired storage bin. The second conveyor system includes a movable and reversible conveyor and a transversely extending conveyor secured to each end of the movable and reversible conveyor for receiving the discharge therefrom.

---

This invention relates generally to storage buildings, and more particularly it pertains to an arrangement of bins with power driven conveyors for the maximum utilization of space in the storage of loose bulk materials.

It is an object of this invention to provide a system for storage which utilizes the structural arrangement of a building in a manner to furnish maximum storage per squrae foot with minimum particle size segregation of materials.

Another object of this invention is to provide an arrangement for bin filling whereby the bin is loaded for the most effective utilization of storage space and greatest convenience in unloading.

To provide a storage building system which eliminates any contamination of stored material, is still another object of this invention.

Also, to provide a storage building of multiple rectangular compartments which are conveyer loaded is contemplated by this invention, together with the feature of easy expansion for greater capacity.

Yet another object of this invention is to provide a bin arrangement for storage which permits complete filling by conveyer means and subsequent complete emptying by front end loader.

Other objects and attendant advantages of this invention will become more readily apparent and understood from the following detailed specification and accompanying drawings in which:

FIG. 3 is a section taken on line 3—3 of FIG. 2.

The storage and handling of bulk materials which are loose and granular is often difficult because the material tends to pile up and overflow the bins in top loading and to spill out and intermingle with that from adjacent bins in bottom unloading.

In the past, tall slender elevator type bin structures have been the only solution to the problem; but besides being an expensive type of structure, the bins still were difficult to bottom unload without elaborate gates which could withstand heavy loading.

In the present invention these problems are overcome in a relatively low, inexpensive structure as will be related.

Figure 1:
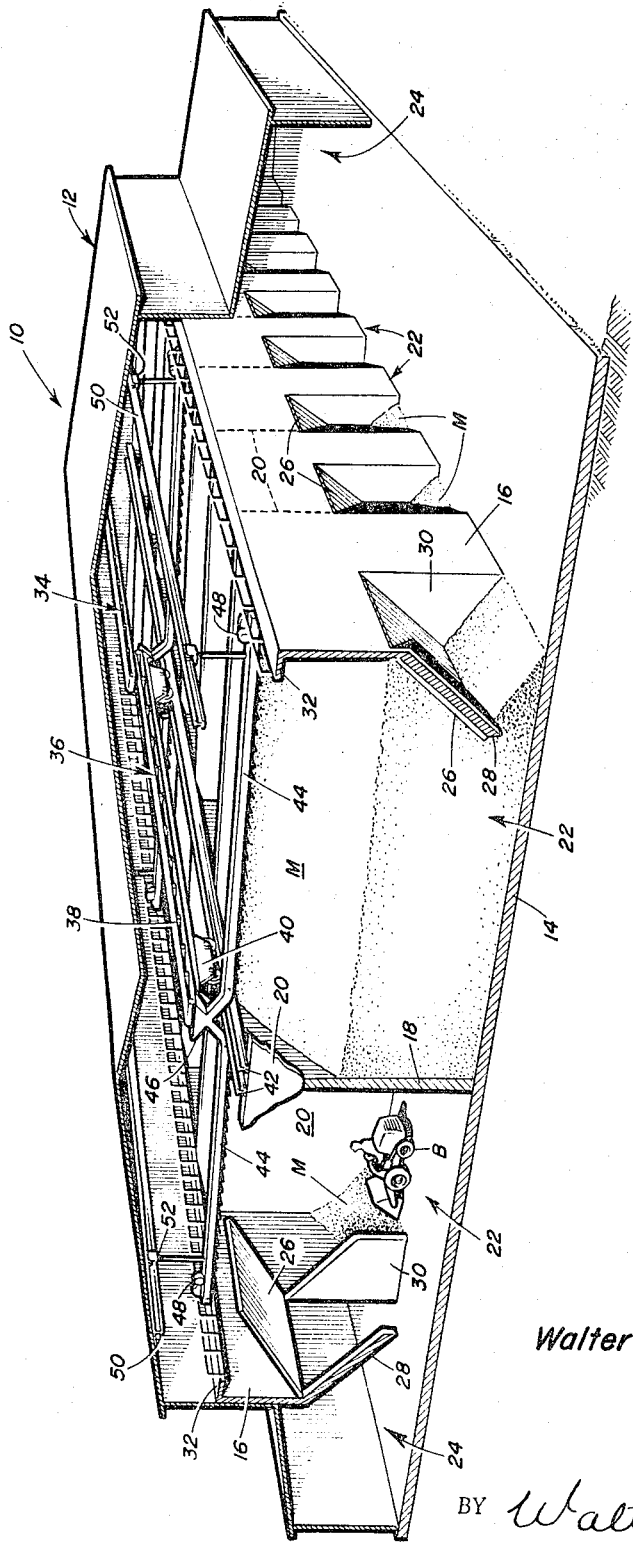
FIG. 1 is a general perspective view of a bulk materials storage building incorporating features of this invention with parts broken away to shown interior details.
Figure 2:
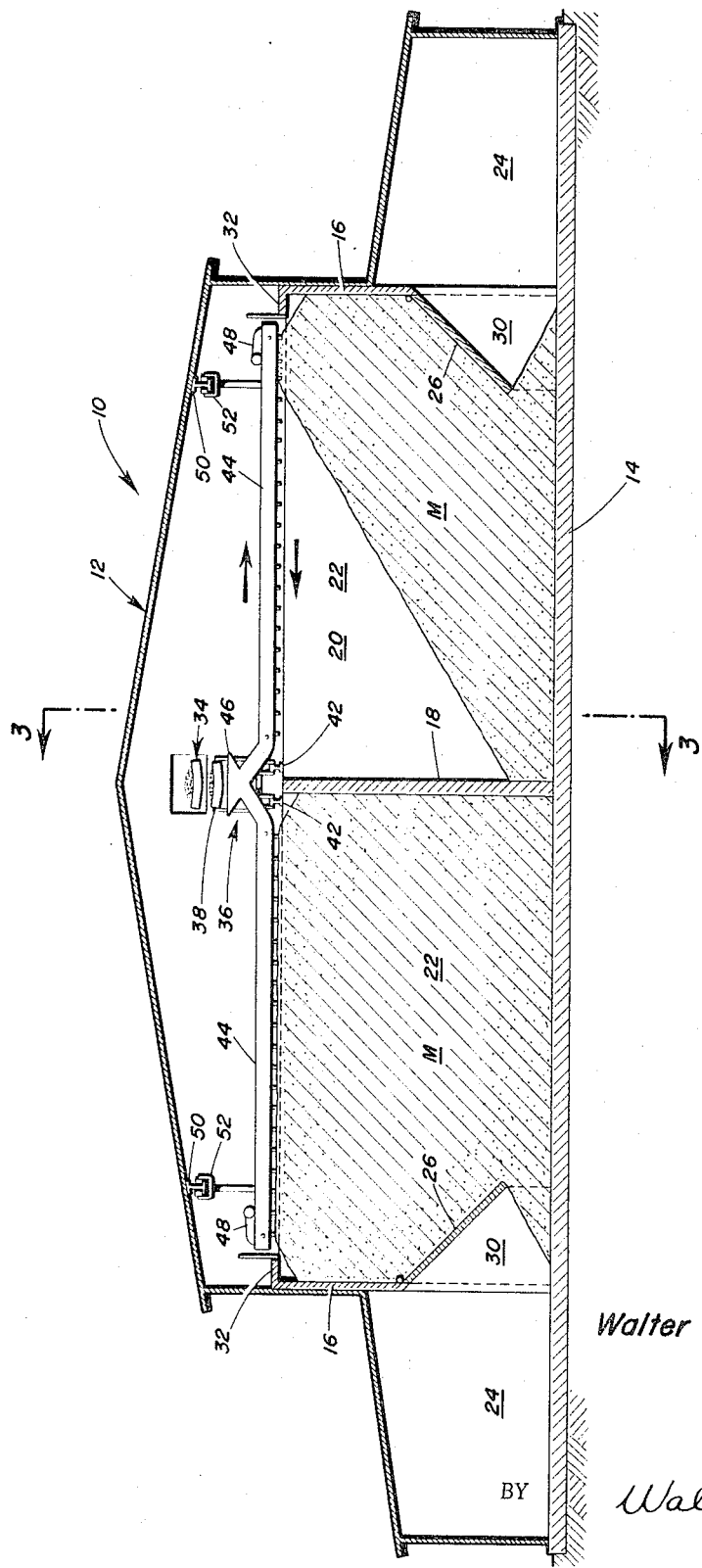
FIG. 2 is a vertical cross section of the building of FIG. 1.

With reference now to the details of the drawings as shown in FIGS. 1 to 3, reference numeral 10 designates generally a plant comprising an enclosing, sheltering structure 12. The plant 10 is built on a flat foundation 14 directly on the ground so as to easily support heavy loads directly thereagainst.

The plant 10 further comprises outer longitudinal walls 16 and a central longitudinal wall 18 inside the shelter structure 12. Transverse walls 20 divide up the area defined by walls 16 and 18 into a plurality of rectangular open top storage bins 22 which back up against the common central wall 18. Sheltered aisles 24 are provided alongside the outer walls 16 to provide access to top hinged doors 26 built into each bin 22. These doors 26 hingle inwardly and normally rest at a downwardly sloping angle on elevated door supports 28 and the tops of inwardly extending supporting walls 30, both of which preferably extend to the top of the bins 22 to prevent the material M from spilling into the path of the doors 26. The doors 26, because of their steep angle, are capable of supporting considerable weight on their surfaces and in normal closed condition mentioned extend nearly to the foundation 14.

A catwalk 32 extends along the top of each outer wall 16 from which to observe bin loading and provide access to a pair of conveyers 34 and 36 which operate above the bins 22.

The conveyer 34 is stationary and enters the structure 12 from one end and connects on the outside with loading means not shown. This conveyer 34 extends over the center wall 18 of the plant and discharges at about the center thereof. The second conveyer 36 is H-shaped and operates directly beneath the conveyer 34 on carriages 40 and 52 and rails 42 and 50. This conveyer 36 has a reversible belt conveyer 38 which extends longitudinally above the center wall 18 and is long enough to reach from the center of the plant to either end bin 22 as best shown by FIG. 3. A receiving hopper or funnel 46 is secured on each end of the longitudinal conveyer 38 and each feeds a pair of oppositely extending transverse conveyers 44 as best shown in FIG. 2.

The outer ends of these four transverse conveyers with their drive units 48 depend from end carriages 52 which run on roof supported rails 50 as shown so the entire H-shaped structure of the traveling distributer conveyer 36 can move as a whole and be positioned as desired above the bins 22.

Accordingly, material brought into the building at the top is introduced from conveyer 34 onto the longitudinal conveyer 38 which carries it in a desired direction to one funnel 46.

One of the transverse conveyers 44 then transports the material across the desired bin and discharges it upon the sloping surface of the door 26 into the desired bin 22.

Some of the material M extends beneath the door without extending into the aisle 24 allowing ready access for withdrawal as needed. The rest is deflected by the door 26 to spread and fill the corners of the bin 22. The usual granular material has an angle of repose of about 33 degrees and tends to pile above the bin tops. Since the belt underside of the conveyer 44 is traveling oppositely to the top side (see arrows in FIG. 2) the peak of the pile is caused to be removed continually and moved toward the rear of the bin. Thus any tendency to overflow is counteracted. The operator then has only to move the conveyer 36 from the position shown in FIG. 3 to either right or left to fill an entire bin 22 to the brim. Other bins 22 are similarly filled by suitably positioning the conveyer 36 and operating its conveyers 38 and 44 as required.

Since it is important not to contaminate certain materials it is easy in the present system to completely clean out a nearly empty bin 22 by raising the door 26 as shown in FIG. 1 and driving a front loader vehicle B inside. The square corners of these bins are then easily emptied, ready for a different material.

A plant, of the type which has been described, is easily expanded by adding bins to the ends and lengthening the tracks for the conveyers.

Obviously many modifications and variations of the present invention are possible in light of the above teachings. It is, therefore, to be understood that within the scope of the appended claims the invention may be practiced otherwise than as specifically described.

What is claimed is:

1. A building arrangement for storing granular material on a base, comprising, supporting wall structure defining a storage bin on said base, said wall structure having an opening therein terminating at said base, spaced supporting walls extending into said storage bin from each side of said opening, with each said supporting wall having a corresponding upper angular surface extending downwardly into said storage bin from said opening and terminating short of said base, an inwardly and downwardly extending movable door positioned over said opening and having its lower edge terminating short of said base, pintle means positioned along the top edge of said wall structure defining said opening for securing said movable door to the top edge of the wall structure defining said opening, with said movable door being securely held adjacent the upper angular surfaces of said spaced supporting walls in a closed position in said opening by the weight of stored granular material thereabove and arranged to be opened fully for access to said storage bin when said storage bin is being emptied of granular material through said opening.

2. A building arrangement for storing granular material on a base as recited in claim 1, and sheltering structure positioned on said base and including outer walls and roof means positioned over said outer walls, inner walls positioned on said base and defining together with said outer walls a plurality of storage bins for said granular materials in the interior of said sheltering structure, with each said tsorage bin having said opening in one of its defining walls.

3. The building arrangement of claim 2 wherein said inner walls are common to adjacent storage bins and said opening for each storage bin is in its respective outer wall, whereby the entire interior of said sheltering structure is for storage purposes.

4. The building arrangement of claim 3 wherein said base and roof means extends beyond the exterior of said outer walls so as to form sheltered aisles therealong.

5. In combination with the building arrangement of claim 2, first conveyor means for receiving said granular material as it first enters said building and second conveyor means for receiving the discharge from said first cenveyor means and directing it to the storage bin desired, said second conveyor means including a movable and reversible conveyor and a transversely extending conveyor secured to each end of said movable and reversible conveyor for receiving the discharge thereof.

6. In combination with the building arrangement of claim 5 wherein said first conveyor means is positioned along the longitudinal axis of said building arrangement and said movable and reversible conveyor is movable along said axis.

7. In combination with the building arrangement of claim 5 and additionally, movable carriage means for supporting the extremity of each transversely extending conveyor.

8. In combination with the building arrangement of claim 7 wherein said reversible conveyor and transversely extending conveyor secured to each of its ends form an H-shape.

9. In combination with the building arrangement of claim 5 wherein said first conveyor means is stationary.

10. In combination with the building arrangement of claim 5 wherein said first conveyor means is a stationary conveyor positioned along the longitudinal axis of said building arrangement to discharge said granular material at the center thereof and said reversible conveyor is movable along the same axis.

References Cited

UNITED STATES PATENTS

| 1,217,424 | 2/1917 | Eaton | 52—195 X |
| 2,277,416 | 3/1942 | Rutten | 198—101 X |
| 3,063,416 | 11/1962 | Elstner | 52—192 X |

GERALD M. FORLENZA, *Primary Examiner.*

R. G. SHERIDAN, *Examiner.*